Feb. 6, 1968 G. M. FEDERSPILL 3,367,690
BUSHING AND METHOD OF MAKING SAME
Filed April 19, 1965 2 Sheets-Sheet 1
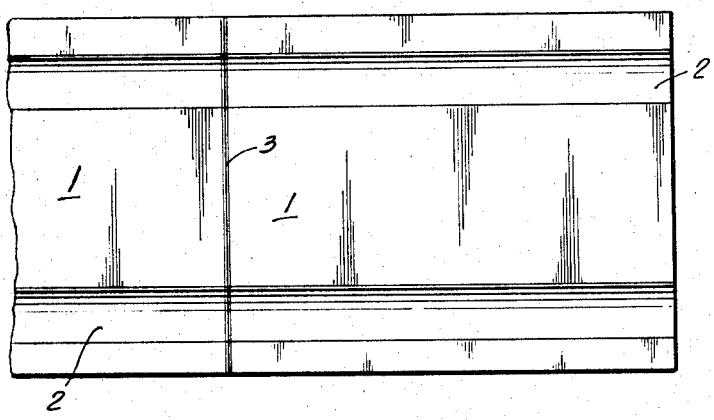
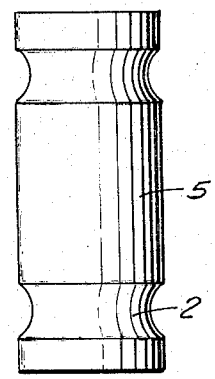
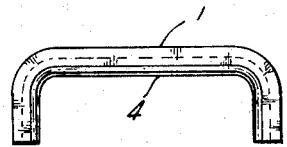
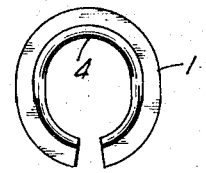
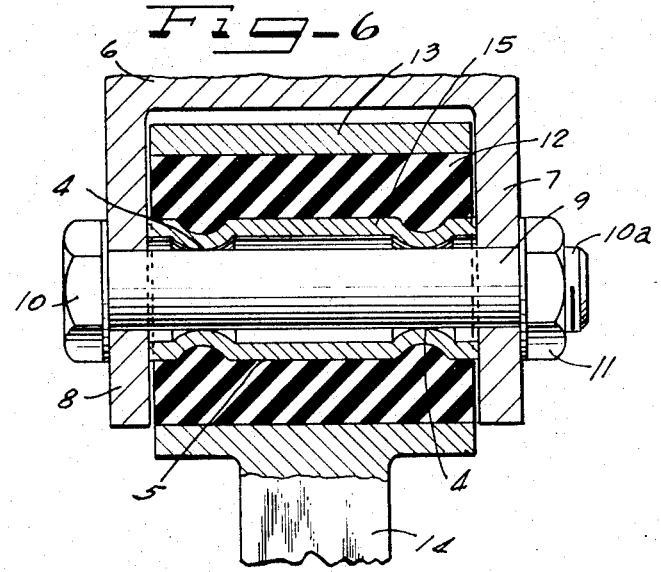
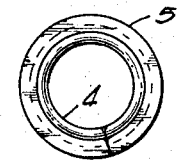
INVENTOR.
GEORGE M. FEDERSPILL
BY *Hill, Sherman, Meroni, Gross & Simpson*   ATTORNEYS Feb. 6, 1968 G. M. FEDERSPILL 3,367,690
BUSHING AND METHOD OF MAKING SAME
Filed April 19, 1965 2 Sheets-Sheet 2
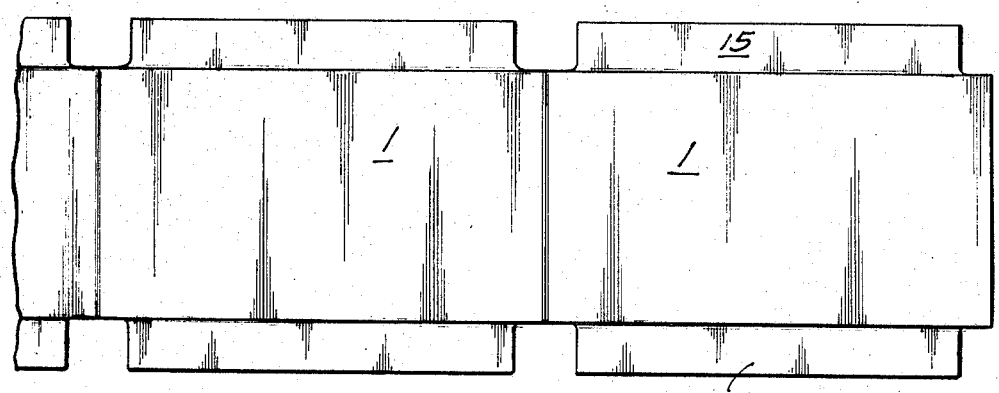
Fig-7
Fig-9
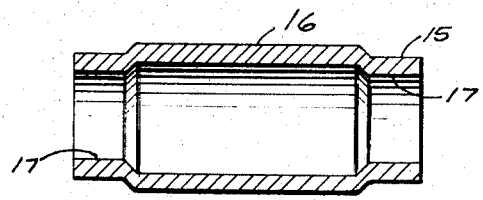
Fig-8
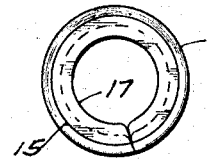
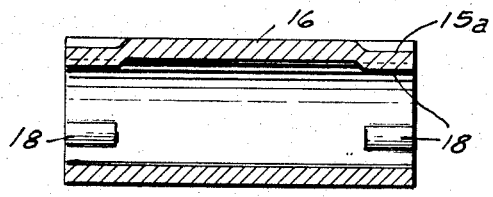
Fig-10
Fig-11
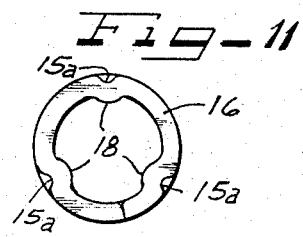
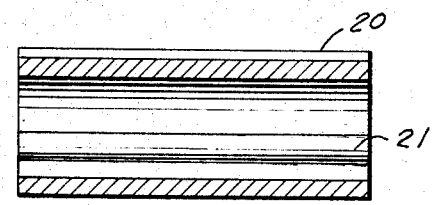
Fig-12
Fig-13
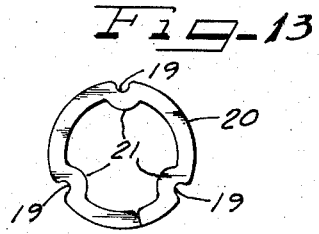
INVENTOR.
GEORGE M. FEDERSPILL
BY Hill, Sherman, Meroni, Gross & Simpson ATTORNEYS

United States Patent Office

3,367,690
Patented Feb. 6, 1968

3,367,690
BUSHING AND METHOD OF MAKING SAME
George M. Federspill, Kokomo, Ind., assignor to Steel Parts Corporation, Tipton, Ind., a corporation of Indiana
Filed Apr. 19, 1965, Ser. No. 448,924
1 Claim. (Cl. 287—85)

ABSTRACT OF THE DISCLOSURE

A bushing assembly for use in a steering or suspension joint of an automotive vehicle having a tubular bushing with indentations to form bearing contact surfaces to engage a bearing member inserted through the bushing. The bushing is attached to a concentric outer hollow member by an elastic body secured to the exterior surface of the bushing and the interior surface of the hollow member.

---

This invention relates to a bushing and method of making same and is particularly concerned with the provision of a bushing for use in flexible joints such as are commonly used in automotive steering and suspension systems. These joints usually consist of a yoke type housing having a supporting bolt extending through laterally spaced walls thereof, a bushing carried by the bolt and held in a desired non-rotatable position relative thereto by engagement of the walls of the housing with the end of the bushing being effected by the tightening of a nut on the bolt outside of one of said walls. In such structures, a cylindrical elastic body made of resilient material such as rubber composition is bonded to the exterior of the bushing between the walls of the housing and is also bonded to the interior of a concentric cylindrical member which carries an arm integral therewith or affixed thereto. This arm extends to another member of the steering or suspension system of which it forms a part and relative movement of the parts so connected is permitted solely by flexing of the rubber cylinder.

While it is desirable that the bushing be of relatively large external diameter to afford ample surface for bonding the resilient member thereto, it is also desirable that the inner diameter of the bushing be relatively small to permit of bearing contact with the bolt which, for purposes of economy, standardization and minimum weight, has an external diameter much less than the interior diameter of the tubular portion of the bushing to which the elastic body is bonded.

In the past, these requirements have been partially met by either using a thick walled bushing or by providing a liner for the bushing which has an inner diameter affording bearing contact with the bolt.

The thick walled bushings are relatively expensive and difficult to form by cold work processes usually employed. The provision of a liner, while making it possible to employ a bushing that may be formed by cold working, adds to the cost of the bushing assembly and involves problems in securing of the bushing and liner against longitudinal displacement.

The foregoing deficiencies are overcome by this invention which provides a bushing made from a rolled strip, portions of which are so formed during the rolling operation as to provide intermittent bolt bearing surfaces and at the same time to provide the required large exterior surface when the strip so formed is cold worked to provide the tubular bushing.

It is an object, therefore, of the present invention to provide a bushing of relatively thin walled metal having a large exterior surface area and at the same time providing a plurality of internal surfaces for bearing engagement with a member of relatively small diameter.

It is another object of this invention to provide a method of producing such a bushing by a rolling operation on a strip of metal and the subsequent formation by cold working of predetermined lengths of the rolled strip into the desired generally tubular or cylindrical bushing.

Other and further objects of this invention will be apparent from the specification and the accompanying drawings.

The invention (in a preferred form) is shown on the drawings and hereinafter more fully described.

On the drawings:

FIG. 1 is a fragmentary plan view of a rolled strip used in the formation of a bushing embodying the present invention.

FIG. 2 is an end view showing the first step involved in the formation of the strip into the bushing by a cold working process.

FIG. 3 is an end view showing the second step in the formation of said bushing.

FIG. 4 is an end view of the completed bushing formed from the strip by cold working.

FIG. 5 is a side view of the bushing so formed.

FIG. 6 is a fragmentary sectional view with parts shown in elevation illustrating the manner of use of the improved bushing of this invention.

FIG. 7 is a view similar to FIG. 1 showing the rolled strip used in the formation of another form of bushing embodying the principles of this invention.

FIG. 8 is a longitudinal central section of the bushing formed from predetermined lengths of the rolled strip of FIG. 7.

FIG. 9 is an end view of the bushing constructed as shown in FIG. 8.

FIG. 10 is a view similar to FIG. 8 showing a modified form of bushing formed from a strip of the general arrangement shown in FIG. 7.

FIG. 11 is an end view of the bushing of FIG. 10.

FIG. 12 is a longitudinal central section taken through another bushing embodying the principles of this invention and having the spaced bearing strips extending throughout the longitudinal extent of the bushing.

FIG. 13 is an end view of the bushing shown in FIG. 12.

As shown in the drawings:

Bushings embodying the principles of the present invention are preferably constructed from rolled strips of flat metal designated generally by the reference numeral 1. In rolling the strip shown in FIG. 1, concave longitudinal depressed portions 2 are formed therein spaced inwardly from either edge of the strip. After the strip is so formed, it is cut into predetermined lengths along the lines 3.

As shown in FIG. 2, a predetermined length of the strip 1 is first cold worked into a U-shaped form so that the concave portions 2 of the strip provide inwardly extending bearing surfaces 4 which have an internal diameter considerably less than the internal diameter of the completed tubular bushing, which is designated by the reference numeral 5 in FIGS. 4 and 5, having been cold worked into the tubular form shown in these figures by a subsequent forming step shown in FIG. 3.

The method of utilization of the improved bushing of this invention in a steering or suspension joint of an automotive vehicle is shown in FIG. 6. As shown in that figure, the housing for the joint is designated by the reference numeral 6 and consists of a lateral support in many cases fastened to the vehicle frame and provided with depending walls 7 and 8 which may be distorted inwardly toward each other under pressure. The bushing 5 is rotatably mounted on a bolt 9 having a head 10 engaging the outside of the wall 7 either directly or through the intermediary of a washer and a projecting threaded portion 10a on which is mounted a nut 11 that may be drawn tightly against the outer face of the wall 7 to force the walls 7 and 8 toward each other and to cause the ends of the bushing 5 to engage the inner surfaces of said walls with a frictional engagement preventing turning of the bushing relative to the housing 6 and its walls 7 and 8. If desired, the ends of the bushing may be roughened as by serration or the like to enhance this frictional engagement which prevents relative rotation of the bushing and housing.

Bonded or otherwise suitably permanently secured to the outer surface of the bushing 5 is a cylindrical elastic member 12 of resilient material such as rubber composition surrounded by a second cylindrical member 13 also bonded thereto, the cylindrical member having affixed thereto or integral therewith an arm 14 which extends for connection to another part of the automotive steering or suspension system.

As will be seen from the foregoing, the bearing surfaces 4 resulting from the concave portions 2 in the rolled strip extend inwardly and afford spaced bearing contact with the outer diameter of the bolt 9 which outer diameter, as will be noted, is considerably less than the major portion of the inner diameter of the bushing 5. The major portion of the bushing 5 extends on each side of the bearing surface 4. Thus, there is afforded a large exterior bushing surface for bonding or otherwise securing the elastic body thereto and at the same time, the bushing may be utilized with standard bolts of relatively small diameter.

In the form of this invention shown in FIG. 7, the strip 1 is rolled to provide offset edge portions 15 which are formed in a plane parallel to but offset from the plane of the strip 1. When formed into the bushing 16, these edge portions 15 afford spaced bearing surfaces for bearing engagement with a bolt such as shown at 9 in FIG. 6 and at the same time permit of a major portion of the inner diameter of the bushing which extend therebetween to be spaced from the outer surface of such bolt 9.

In the form of this invention shown in FIGS. 10 and 11, the edges of the strip 1, instead of being continuously distorted as at 15 in FIG. 7, are intermittently distorted to provide projections which extend inwardly into the bushing for a short distance from each end thereof and provides spaced bearing surfaces for supporting the bushing on the bolt 9. These bearing surfaces are designated by the reference numeral 18 in FIGS. 10 and 11.

Another form of bushing embodying the principles of the present invention is shown in FIGS. 12 and 13. In the form there shown, the strip 1 during its formation is provided with laterally extending concave depressed portions 19 extending completely across the face of the strip. These depressions 19 are symmetrically arranged when the strip is formed into a tubular member to provide the bushing 20 and in this instance the bolt bearing surfaces 21 extend throughout the length of the bushing providing the required bearing area and at the same time permitting a major portion of the internal diameter of the bushing to be spaced from the outer diameter of the bolt 9.

As will be seen from the foregoing, this invention provides a fairly lightweight, inexpensive bushing which readily may be formed from rolled strip by relatively simple cold working processes. In each instance, the required bearing surface with the small diameter supporting bolt is provided and at the same time the large exterior surface desirable for affording a bonding support for the elastic body is provided. Utilization of this invention makes it possible to provide a single thickness unlined bushing of a desired external diameter but at the same time having bearing surfaces for proper bearing contact with suitable supporting and securing bolts. Indeed, the distortions in the surface of the bushing tend to facilitate the non-rotatable adherence of the elastic body to the outer surface of said bushing.

I am aware that details of construction may be varied and I therefore do not purpose limiting the patent granted hereon otherwise than necessitated by the scope of the appended claims.

I claim:

1. In combination, a housing having spaced side walls, a bearing member extending transversely of the housing and carried by said side walls, a generally tubular bushing concentric with said bearing member, and having an exterior surface for receiving and supporting an elastic body to be secured to said bushing, the wall of said bushing having inward extending integral depressed portions providing a bearing engagement with said bearing member and a corresponding depression on said exterior surface for receiving a portion of said elastic body while the major portion of said bushing is radially spaced from said bearing member, each of said depressed portions having at least two edge portions integral with said major portions, said depressed portions being circumferentially spaced about the wall of said bushing and extending only a part of the length of said bushing, and an elastic body concentric with said bearing member and secured to said surface, a second member concentric with said bushing and secured to the exterior of said elastic body, and means secured to said second member movable only by flexure of said elastic body.

References Cited

UNITED STATES PATENTS

| 1,827,234 | 10/1931 | Hughes | 267—54 |
|---|---|---|---|
| 2,069,781 | 2/1937 | Skillman et al. | |

FOREIGN PATENTS

| 1,031,726 | 3/1953 | France. |
|---|---|---|
| 288,353 | 1/1928 | Great Britain. |
| 481,337 | 3/1938 | Great Britain. |
| 517,514 | 3/1955 | Italy. |

CARL W. TOMLIN, *Primary Examiner.*

A. V. KUNDRAT, *Assistant Examiner.*